United States Patent [19]

Smith

[11] Patent Number: 5,540,014
[45] Date of Patent: Jul. 30, 1996

[54] PLANT COVER

[76] Inventor: A. Graeme Smith, 190 Cullen Dr., Winnipeg, Manitoba, Canada, R3R 1P6

[21] Appl. No.: 260,324
[22] Filed: Jun. 15, 1994
[51] Int. Cl.$^6$ .................................................. E04B 7/08
[52] U.S. Cl. ...................... 52/81.1; 52/86; 52/4; 135/118
[58] Field of Search ........................... 52/81.1, 86, 584.1, 52/4; 135/118

[56] References Cited

U.S. PATENT DOCUMENTS

| | | | |
|---|---|---|---|
| 4,229,914 | 10/1980 | Lucas | 52/86 X |
| 4,306,392 | 12/1981 | SoRelle | 52/81.1 |
| 4,364,205 | 12/1982 | Scott | 52/4 |
| 4,651,478 | 3/1987 | Dahl et al. | 52/81.1 X |
| 4,784,172 | 11/1988 | Yocoboni | 52/81.1 X |
| 4,796,395 | 1/1989 | Israel | 52/86 |
| 4,864,794 | 9/1989 | Scourtelis | 52/584.1 |
| 5,155,951 | 10/1992 | Lalvani | 52/81.1 X |

Primary Examiner—Carl D. Friedman
Assistant Examiner—W. Glenn Edwards
Attorney, Agent, or Firm—Adrian D. Battison; Murray E. Thrift

[57] ABSTRACT

A kit of parts for forming a plant covering device for the protection of garden plants and shrubs from external environmental conditions. The parts are made of semi-rigid plastics material molded into component panels allowing many different configurations to be made out of a few standard components. The individual component panels are provided with flanges and joining strips for joining the separate component panels into a completed assembly and strapping arrangement for holding the plant covering device in place on a supporting surface.

17 Claims, 9 Drawing Sheets

PLANT COVER

BACKGROUND OF THE INVENTION

This invention relates to a kit of parts for forming a plant covering device for the protection of garden plants and shrubs from external environmental conditions. The kit contains parts for assembly into many different configurations from a few standard components.

Plants and shrubs are at risk from a variety of environmental hazards, cold weather in the spring or early fall bringing frost, losses and damage due to animals or insects feeding off the plants, contamination or damage due to wind born contaminants, heavy rains, hail or snow. An effective means of protecting plants from these hazards is to isolate them from the environment by covering them with a structure which allows light in and water to be added but prevents pests, wind and bad weather from harming the plants. It is also advantageous if this structure is easy to set up or build, and is inexpensive so that it is affordable by the home gardener.

Presently few solutions address all of these problems. Plant covering devices currently exist in the form of greenhouses which are large permanent fixed structures which are expensive and impractical for the average hobby gardener. Hoop arrangements which are erected over gardens and that are covered with transparent or semi transparent polyethylene and like materials are known but these are expensive, large, and are difficult to set up and move. Small fiberglass boxes are available for home gardens but these are of fixed dimensions making it impossible to add to or adjust them if the need arise and, they are heavy to move, and are expensive to buy.

SUMMARY OF THE INVENTION

It is one object of the present invention, therefore, to provide an improved plant covering device which gives protection to the plants while at the same time providing ease of use, flexibility in terms of the configuration and form of the device, and is priced such that it makes it practical for both commercial and home gardening.

The plant covering device described protects plants against most early frosts or late snows, against losses and damage due to animals feeding off the plants, against damage caused by insects, from accidental contamination or damage due to wind born contaminants such as disease spores, weed seeds, herbicides, insecticides, and heavy rains prevents crushing and drowning of plants.

According to one aspect of the invention there is provided a kit of parts for forming a plant covering device of the type for enclosing a space and isolating said space from external environmental conditions, said kit comprising a plurality of individual component panels molded of a semi-rigid plastics material for assembly into a structure wherein the individual component panels are provided with fastening means for joining the separate component panels into a completed assembly, said assembly having a top, sides, and a bottom edge, the bottom edge for resting on a supporting surface, and wherein the kit of parts has fixing means for holding the plant covering device in place on a supporting surface.

Preferably wherein different configurations can be formed from the same individual components.

Preferably wherein one component comprises a top corner panel of at least one sheet of structural material joined or formed into a single piece, the sheet being generally part spherical with an apex at a top, a right side edge, a left side edge, and a bottom edge such that the right side edge extends downward from the apex to the bottom edge meeting at a right most bottom corner, a left side edge extends downward from the apex to the bottom edge meeting at a left most bottom corner in such a way as to result in a continuous surface therebetween describing an angle of 90 degrees in the horizontal plane from the right most bottom corner to the left most bottom corner, and an angle of 90 degrees in the vertical plane from the apex to each of the right most bottom corner and the left most bottom corner thereby enclosing a space therein, the continuous surface having an inner and outer surface, and wherein each side edge projects at an angle away from the outer surface forming an alignment surface then projects perpendicular to the alignment surface forming a flange extending along each side edge, the flange being spaced in from the apex and each corner such that the plane of the flange on the right side lies at 90 degrees to the plane of the flange on the left side, the bottom edge projects vertically downwards a distance forming an alignment surface then projects horizontally outwards forming a flange perpendicular to the alignment surface, the flange being spaced in from each corner lying in the horizontal plane and extending along the bottom edge.

Preferably wherein one component comprises a flat panel of at least one sheet of structural material joined or formed into a single piece, the sheet being generally rectangular in shape having a top edge, bottom edge, and side edges meeting at each of four corners in such a way as to form a continuous surface therebetween, the continuous surface having an inner and outer surface, and wherein each edge has a flange projecting perpendicular to and outward from the outer surface of the panel, the flange being spaced in from each corner and extending along the edge.

Preferably wherein one component comprises an angled panel of at least one sheet of structural material joined or formed into a single piece, the sheet being generally rectangular in shape having a top edge, bottom edge, and side edges meeting at each of four corners in such a way as to form a continuous surface therebetween, the continuous surface having an inner and outer surface, such that the continuous surface is angled inwards along a line running parallel to the top and bottom edges of the panel, and wherein each side edge has a flange projecting perpendicular to the outer surface of the panel, the flange being spaced in from each corner and extending along the side edge, the top edge projects horizontally outwards a distance forming an alignment surface then projects vertically upwards forming a flange perpendicular to the alignment surface, the flange being spaced in from each corner lying in the vertical plane and extending along the top edge, and the bottom edge which projects vertically downwards a distance forming an alignment surface then projects horizontally outwards forming a flange perpendicular to the alignment surface, the flange being spaced in from each corner lying in the horizontal plane and extending along the bottom edge.

Preferably wherein one component comprises a joiner strip of elongate elastic material being of a generally inverted U shape in cross section.

Preferably wherein the fastening means comprise at least one flange one each individual component panel and at least one joiner strip.

Preferably wherein each flange comprises a top edge, side edges, an inside face, an outside face, and having corners at the intersection of the top edge and each of the side edges, the flange being aligned such that the outside face of each flange will lie collateral with respect to the outside face of the flanges on any other component, so as to cooperate with said other flanges.

Preferably wherein a pair flanges on any two separate components are fixed together such that the outside surfaces of the flanges are collateral, the flanges being fixed together using a joiner strip.

Preferably wherein the flanges and panels are molded of a single piece of material.

Preferably wherein the fixing means comprise a strapping arrangement.

Preferably wherein the strapping arrangement runs across the plant covering device such that the strapping lies along an alignment surface being placed laterally next to the side of a flange and being fixed at each end by a strap fastener and peg arrangement fixing the plant covering device to a supporting surface.

Preferably wherein the strap fastener and peg arrangement comprises a strap fastener having a body of generally rectangular shape with a similarly rectangular opening in the centre sized so as to allow a strap to pass through, and a tab attached to one side of the body wherein said tab folds over so as to lie across the main body in such a way so as to cover both a portion of the body of the fastener and a portion of the opening such that one free end of a strap is positioned so that it is folded back upon a portion of the length of said strap forming a loop, said loop being placed through the opening in the strap fastener body from one side and over a folded tab, the free end being draw back out of the opening from the same side of the strap fastener body such that the strap is held between the tab and the body of the fastener, a peg is placed through the opening in the strap fastener and fixed to a supporting surface.

Preferably wherein the strapping arrangement will run over an alignment surface parallel to the side of a flange through a space between the edge along which the parallel flange lies and flanges lying perpendicular to said parallel flange at each end of the panel thereby being held in place laterally on one side by the inside surface of the parallel flange and being held in place laterally on the other side by the ends of the perpendicular flanges.

Preferably wherein a knock out panel is formed in the continuous surface of a component panel such that a portion of the continuous surface is free to move about an axis forming a flexible member which can be displaced inwards creating a temporary opening in the surface and where the member is initially held in place on the surface by a flange which is removed by severing thereby allowing movement of the panel.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different drawings.

DETAILED DESCRIPTION

Figure 1:
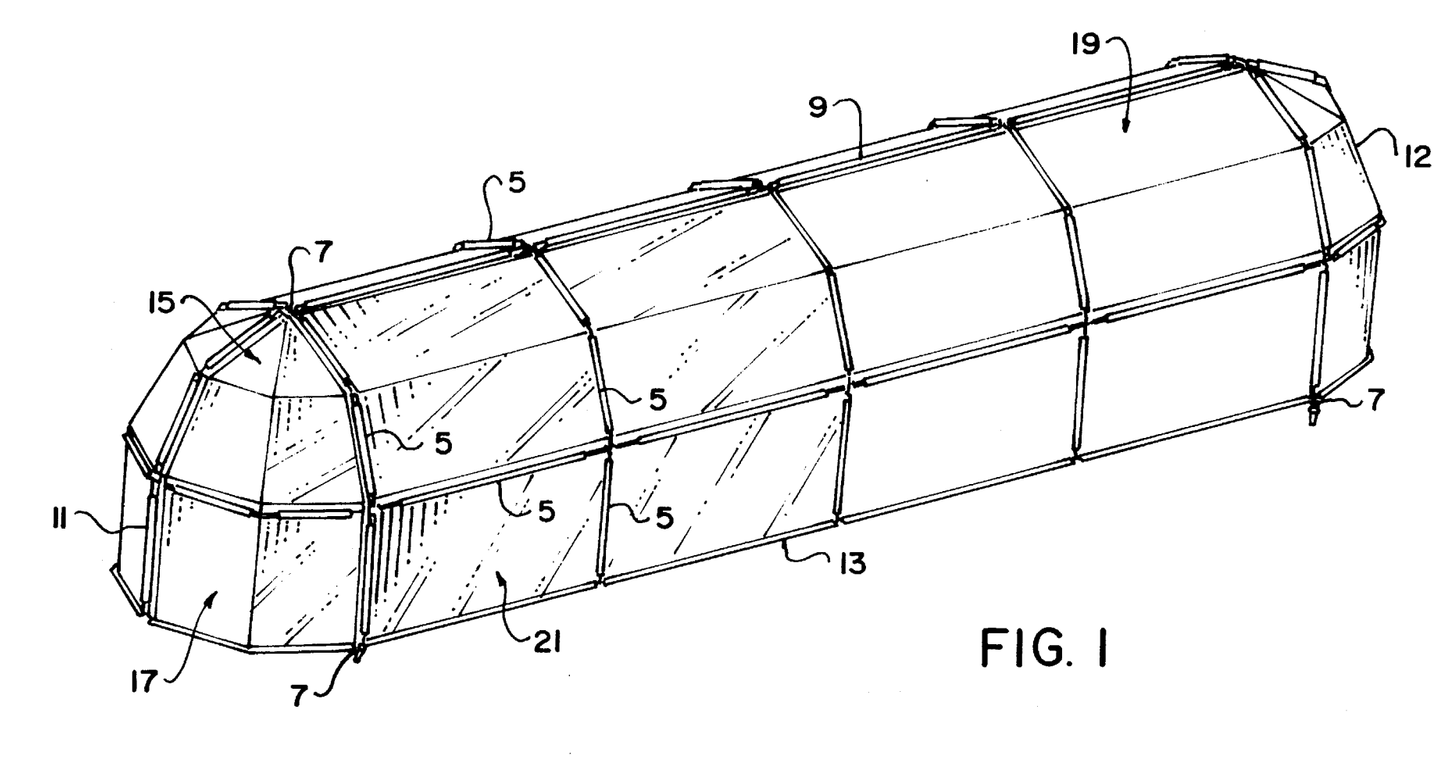
FIG. 1 is a perspective view showing one possible configuration of one plant covering device kit.
Figure 2:
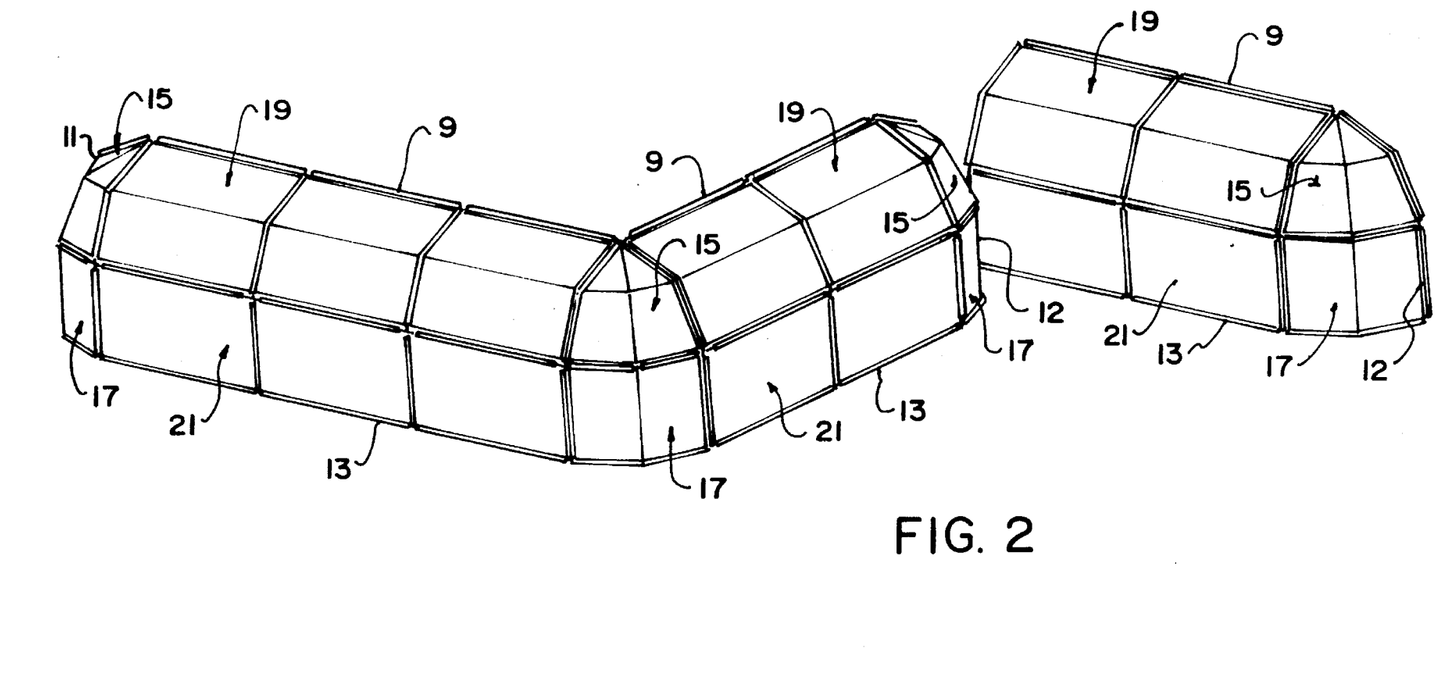
FIG. 2 is a perspective view showing another possible configuration of one plant covering device kit.

Referring to FIGS. 1 and 2 a kit of parts for forming a plant covering device 1 is shown of the type for enclosing a space and isolating that space from external environmental conditions. The plant covering device kit is shown assembled in two different configurations. The kit comprises a plurality of individual component panels, fastening means 5 for joining the separate component panels into a completed assembly, and fixing means 7 for holding the plant covering device in place on a supporting surface. The plant covering device when assembled has a top 9, sides 11 and 12 and a bottom edge 13. The bottom edge rests on a supporting surface.

The individual component panels are molded of a semi-rigid plastics material such that a plurality of different configurations can be assembled from the same individual components. The semi rigid plastics material being a transparent plastics material of a thickness allowing it to flex when a force is applied yet being sufficiently rigid so as to be self supporting. In a preferred embodiment the plant covering device kit comprises the following individual component panels, a top corner panel 15, angled panels 17 and 19, and a flat panel 21. On each edge of each panel is a flange molded so as to be an integral part of the panel.

Figure 3:
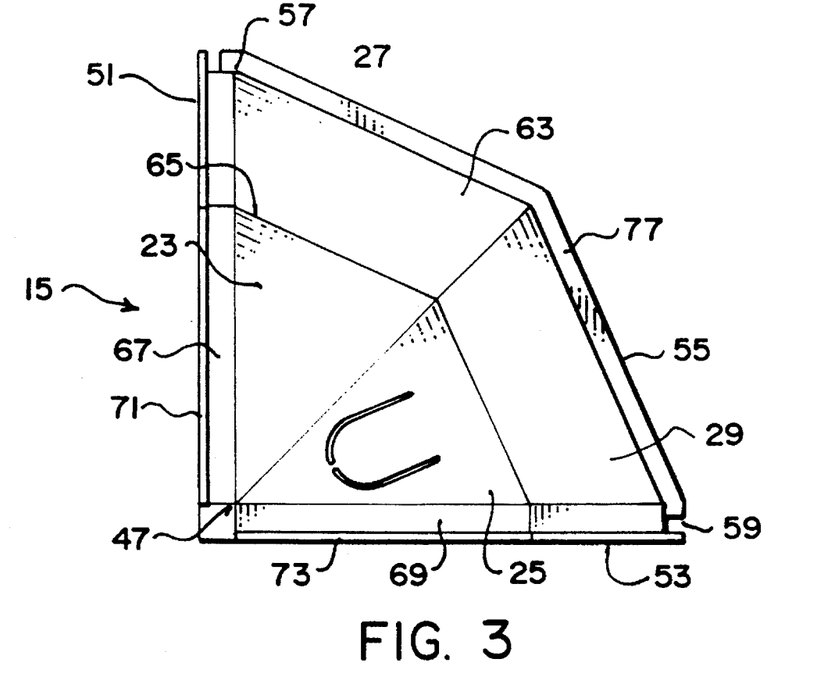
FIG. 3 is a top view of a top corner panel.
Figure 4:
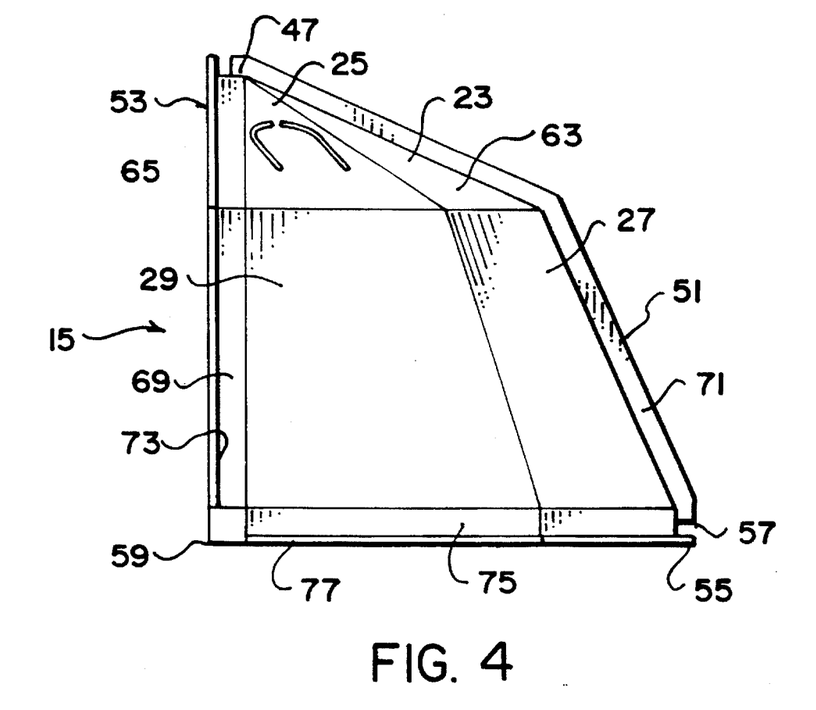
FIG. 4 is a front view of a top corner panel.

Referring to FIGS. 3 and 4 the top corner panel 15 is molded of a single sheet of semi-rigid plastics material, comprising four flat panes, three contact surfaces, three flanges such that they form a generally part spherical enclosure with an apex 47 at a top, a right side edge 51, a left side edge 53, and a bottom edge 55. The right side edge 51 extends downward from the apex 47 to the bottom edge 55 meeting at a right most bottom corner 57 and the left side edge 53 also extends downward from the apex 47 to the bottom edge meeting 55 at a left most bottom corner 59 in such a way as to result in a continuous surface therebetween describing an angle of 90 degrees in the horizontal plane from the right most bottom corner 57 to the left most bottom corner 59 and an angle of 90 degrees in the vertical plane from the apex 47 to each of the right most bottom corner 57 and the left most bottom corner 59 thereby enclosing a space therein. The continuous surface has an inner and outer surface 63 and consists of two triangular top panes 23 and 25 extending from the apex 47 to an point midway between the apex and the bottom edge 65. Below and adjacent to the two triangular top panes are two bottom panes 27 and 29 extending from the point midway between the apex and the bottom edge 65 to the bottom edge 55.

Each side edge 51 and 53 of the top corner panel 15 projects at an angle away from the outer surface 63 forming an alignment surface 67 and 69 for a fixing strap, then projects perpendicular to the alignment surface forming a flange 71 and 73 extending along each side edge. The flange on each side edge is spaced in from the apex 47 and each bottom corner 57 and 59 such that the plane of the flange on the right side lies at 90 degrees to the plane of the flange on the left side.

The bottom edge 55 projects vertically downwards a distance forming an alignment surface 75 for a fixing strap then projects horizontally outwards forming a flange 77 perpendicular to said alignment surface. The flange 77 is spaced in from each bottom corner 57 and 59.

Figures 5, 6:
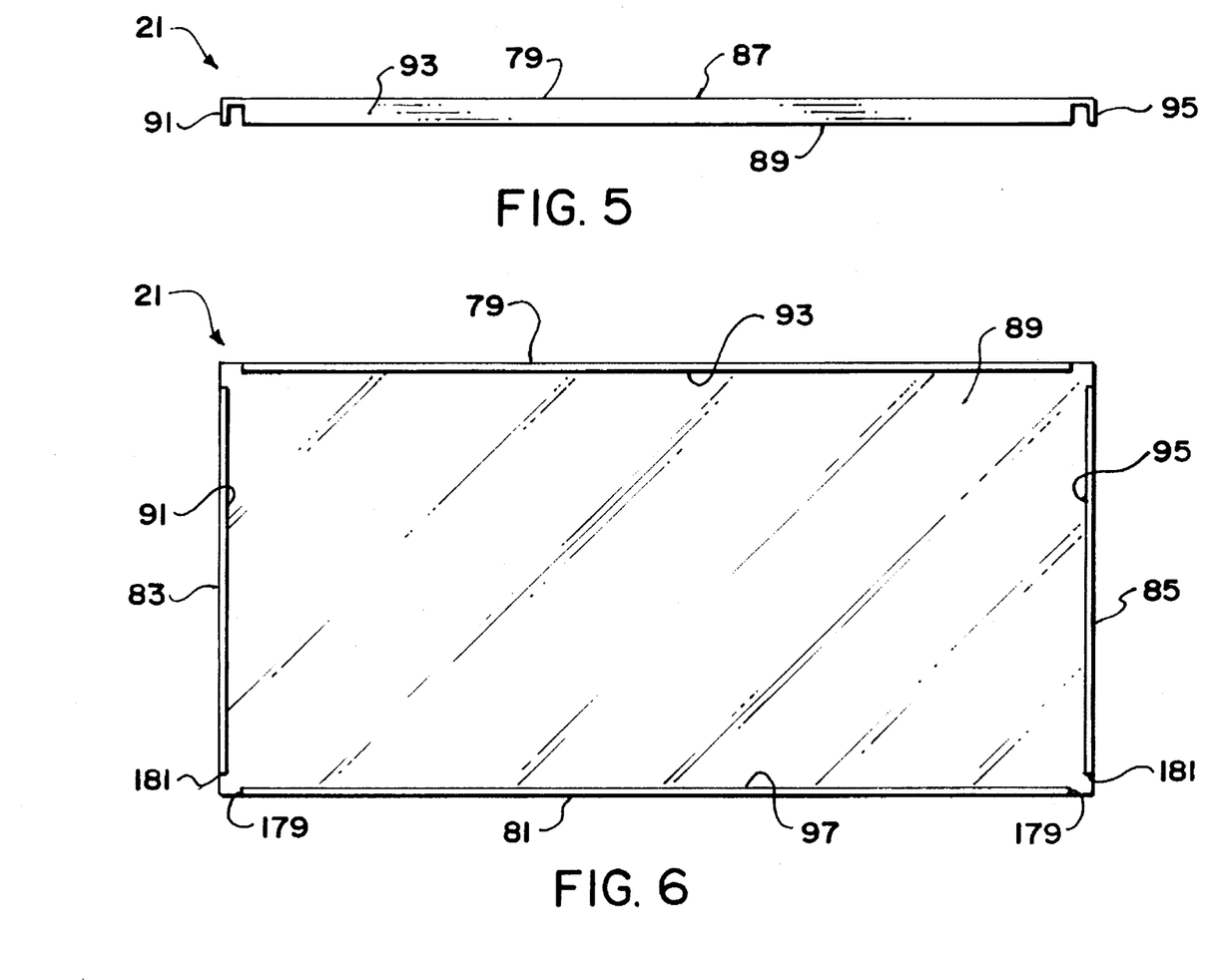
FIG. 5 is a top view of a flat panel.
FIG. 6 is a front view of a flat panel.
Figure 7:
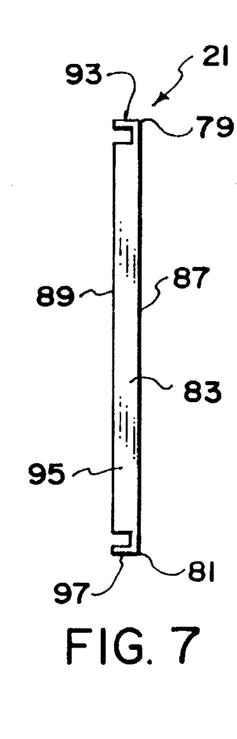
FIG. 7 is a side view of a flat panel.

Referring to FIGS. 5, 6 and 7 a flat panel 21 is molded of a single sheet of semi-rigid plastics material, the sheet is generally rectangular in shape having a top edge 79, bottom edge 81, and side edges 83 and 85 meeting at each of four corners in such a way as to form a continuous surface therebetween. The continuous surface has an inner 87 and outer surface 89. Each edge has a flange 91,93,95,97 projecting perpendicular to and outward from the outer surface of the panel. The flange extends along the edge and is spaced in from each corner.

Figure 8:
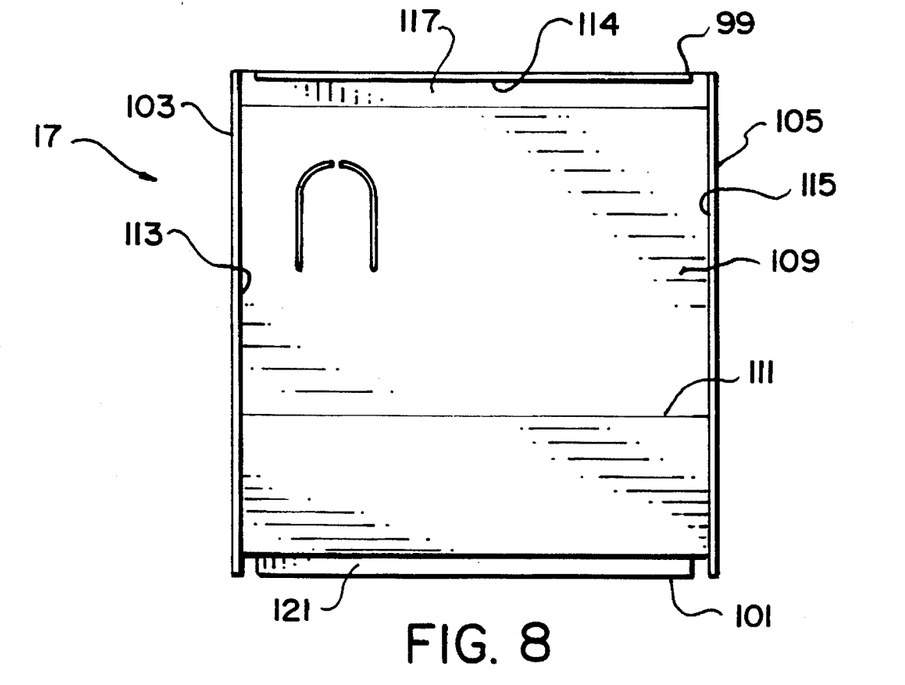
FIG. 8 is a top view of an angled panel.
Figure 9:
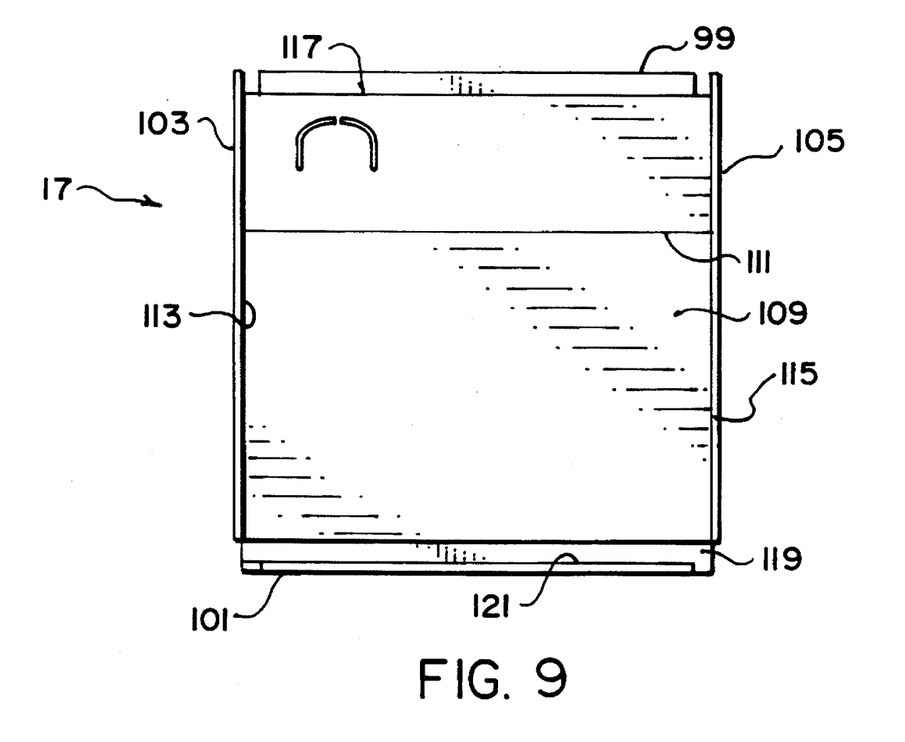
FIG. 9 is a front view of an angled panel.
Figures 10, 11:
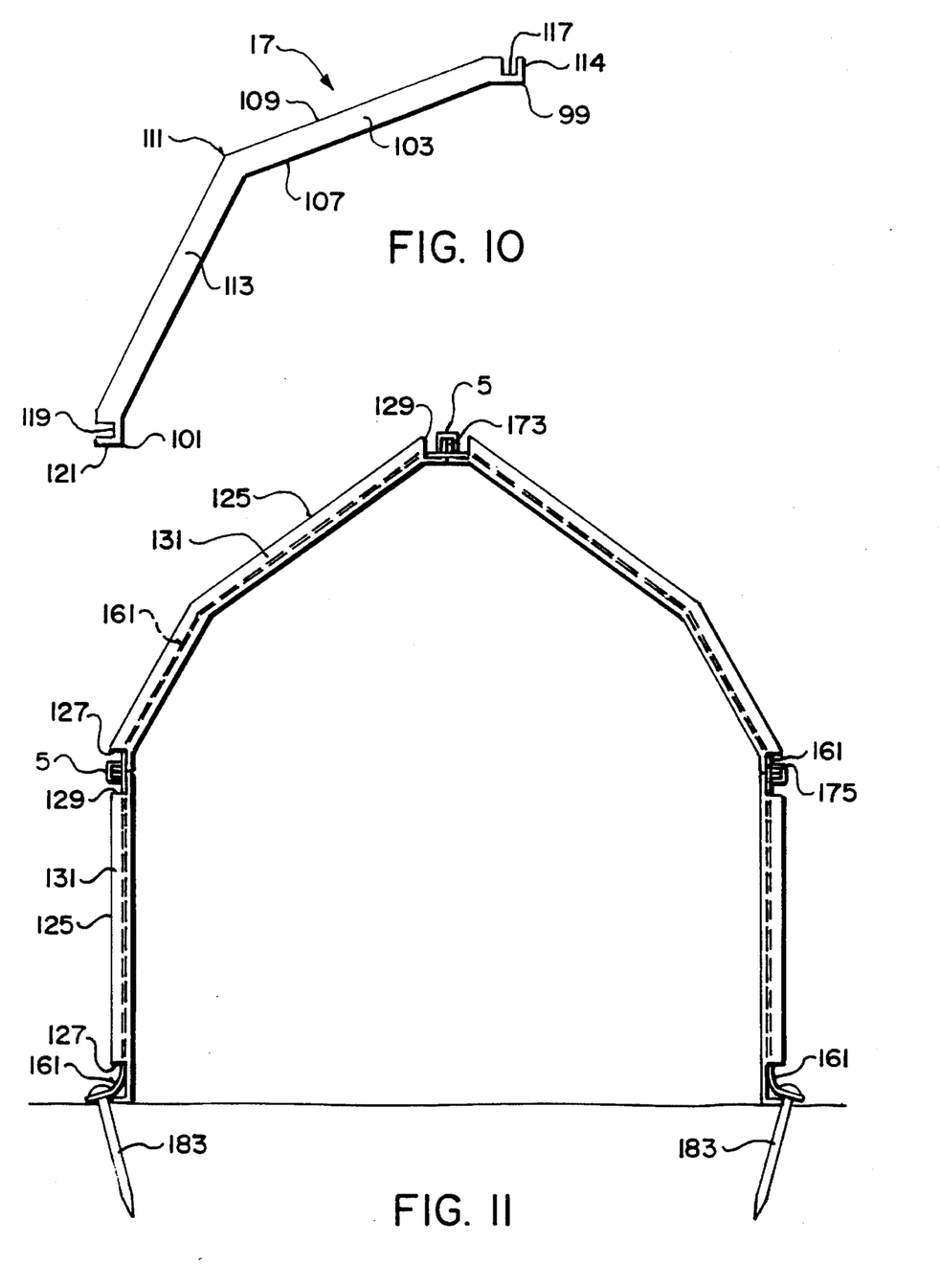
FIG. 10 is a side view of an angled panel.
FIG. 11 is a cross sectional view of an assembled plant covering device showing the fastening means.

Referring to FIGS. 8, 9 and 10 an angled panel 17 is molded of a single sheet of semi-rigid plastics material, the sheet being generally rectangular in shape having a top edge 99, bottom edge 101, and side edges 103 and 105 meeting at each of four corners in such a way as to form a continuous surface therebetween. The continuous surface has an inner 107 and outer surface 109, such that the continuous surface is angled inwards along a line running parallel to the top and bottom edges of the panel 111.

Each side edge 103 and 105 has a flange 113 and 115 projecting perpendicular to the outer surface of the panel. The flange is spaced in from each corner and extends along the side edge.

The top edge 99 projects horizontally outwards a distance forming an alignment surface 117 for a fixing strap, it then projects vertically upwards forming a flange 114 perpendicular to the alignment surface. The flange is spaced in from each corner, lies in the vertical plane, and extends along the top edge.

The bottom edge 101 projects vertically downwards a distance forming an alignment surface 119 then projects horizontally outwards forming a flange 121 perpendicular to the alignment surface 119. The flange 121 is spaced in from each corner, lies in the horizontal plane, and extends along the bottom edge.

In a preferred embodiment the plant covering device kit contains a fastening means. The fastening means 5 consists of a flange on each edge of each individual component panel and a joiner strip for each pair of adjacent panels.

Referring to FIG. 11 the flange comprises a top edge 125, side edges 127 and 129, an inside face 131, and an outside face 133. Each flange on a first component panel is aligned such that its outside face will lie collateral with respect to the outside face of a flange on any second component panel that is placed adjacent the first.

Figure 12:
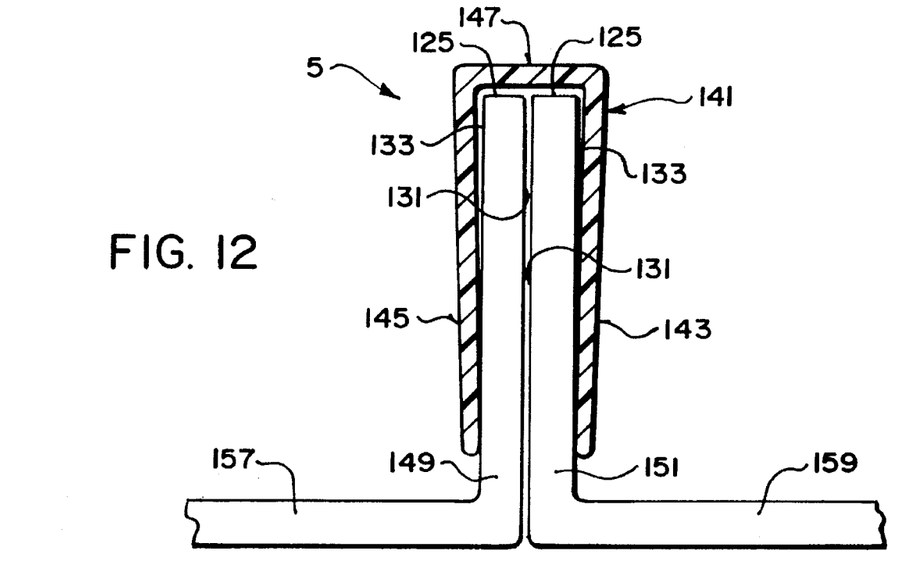
FIG. 12 is an enlarged cross sectional view of the fixing means.

Referring to FIG. 12, the joiner strip 141 consists of an elongate elastic material being of a generally inverted U shape in cross section, the U having two arms 143 and 145 and a base 147. The arms of the U are angled in towards each other such that the space between the two arms at their ends is less than at the base of the U and less than the thickness of the two flanges.

The joiner strip 141 is used to fix any pair of panels together by holding the two adjacent flanges together. The joiner strip is placed so that two adjacent flanges 149 and 151 are positioned between its arms 143 and 145, the arms being in contact with the inside surfaces 133 of each of the two cooperating flanges. The arms of the joiner are forced outward by said flanges and apply a force equal and opposite holding the flanges together, and thereby holding the two panels 157 and 159 together. The joiner strip may be substituted for by any appropriate means of fixing the flanges together.

Figure 13:
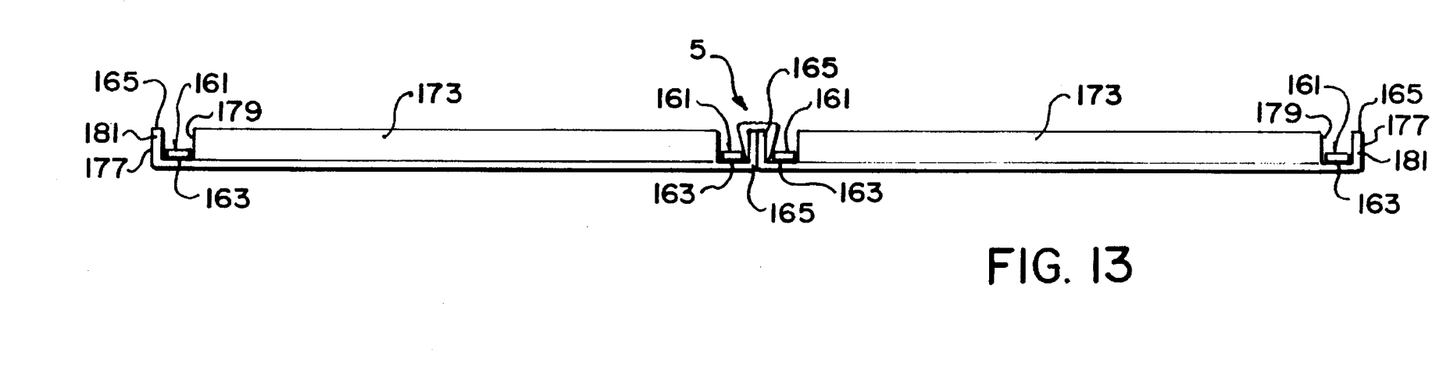
FIG. 13 is an enlarged cross sectional view showing the fastening means.

In a preferred embodiment the plant covering device kit contains a fastening means comprising a plurality of straps forming a strapping arrangement. Referring to FIGS. 11 and 13 the individual straps of the strapping arrangement run across the outside surface of an assembled plant covering device. Each strap 161 lies along an alignment surface 163 on at least one panel. The strapping is positioned laterally and parallel to a flange 165 adjacent the alignment surface. The strap runs past each edge of the panel at both ends of said parallel flange 127 and 129 through the space between the edge along which the parallel flange lies and the flanges 173 and 175 lying perpendicular to said parallel flange.

The strap is held laterally in place on one side by a collateral guide wall, defined by the inside surface of the parallel flange 177, and on the other side by end guide means, defined by the ends of the perpendicular flanges 179. The strap is fixed at each end by a strap fastener and peg 183. The strap fastener connects the strap to the peg. The peg then fixes the plant covering device to a supporting surface thereby holding it in place.

Figure 15:
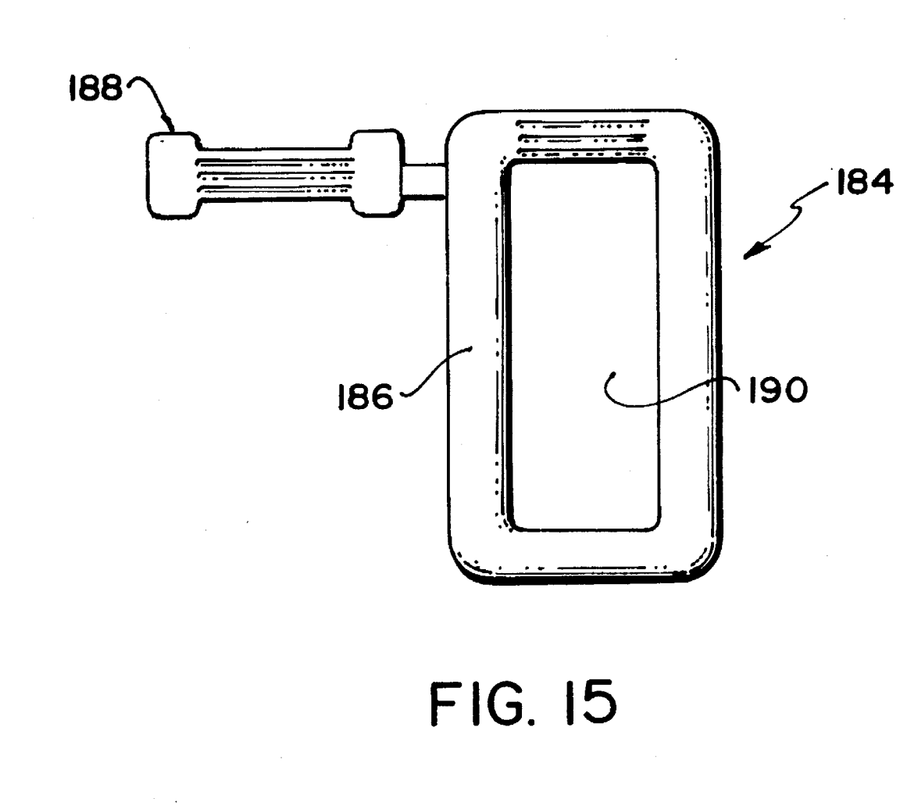
FIG. 15 is a front view showing the strap fastener.

Referring to FIG. 15 the strap fastener 184 is generally rectangular having a body 186 and at least one tab 188. The body is rectangular in shape having a similarly rectangular opening 190 in the centre sized so as to allow a strap to pass through. The strap fastener has at least one tab attached to one side of the body. In use said tab folds over so as to lie across the main body in such a way so as to cover both a portion of the body of the fastener and a portion of the opening at the same time.

Figure 16:
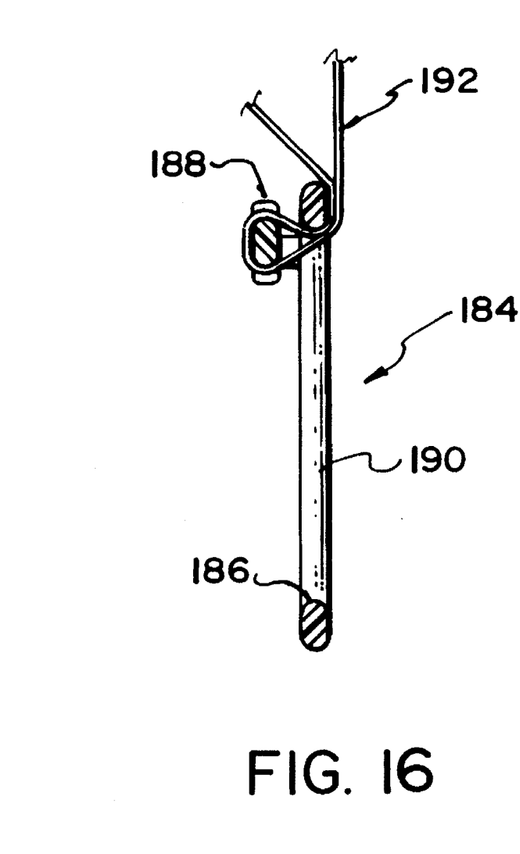
FIG. 16 is a cross sectional view of the strap fastener.

Referring to FIG. 16 in use one free end of the strap 192 is positioned so that it is folded back upon a portion of the length of the strap forming a loop. The loop is placed through the opening in the strap fastener body from one side and over a folded tab. The free end is then drawn back out of the opening from the same side of the strap fastener body such that the strap is held between the tab and the body of the fastener. A peg is placed through the opening in the strap fastener and fixed to a supporting surface.

Figure 14:
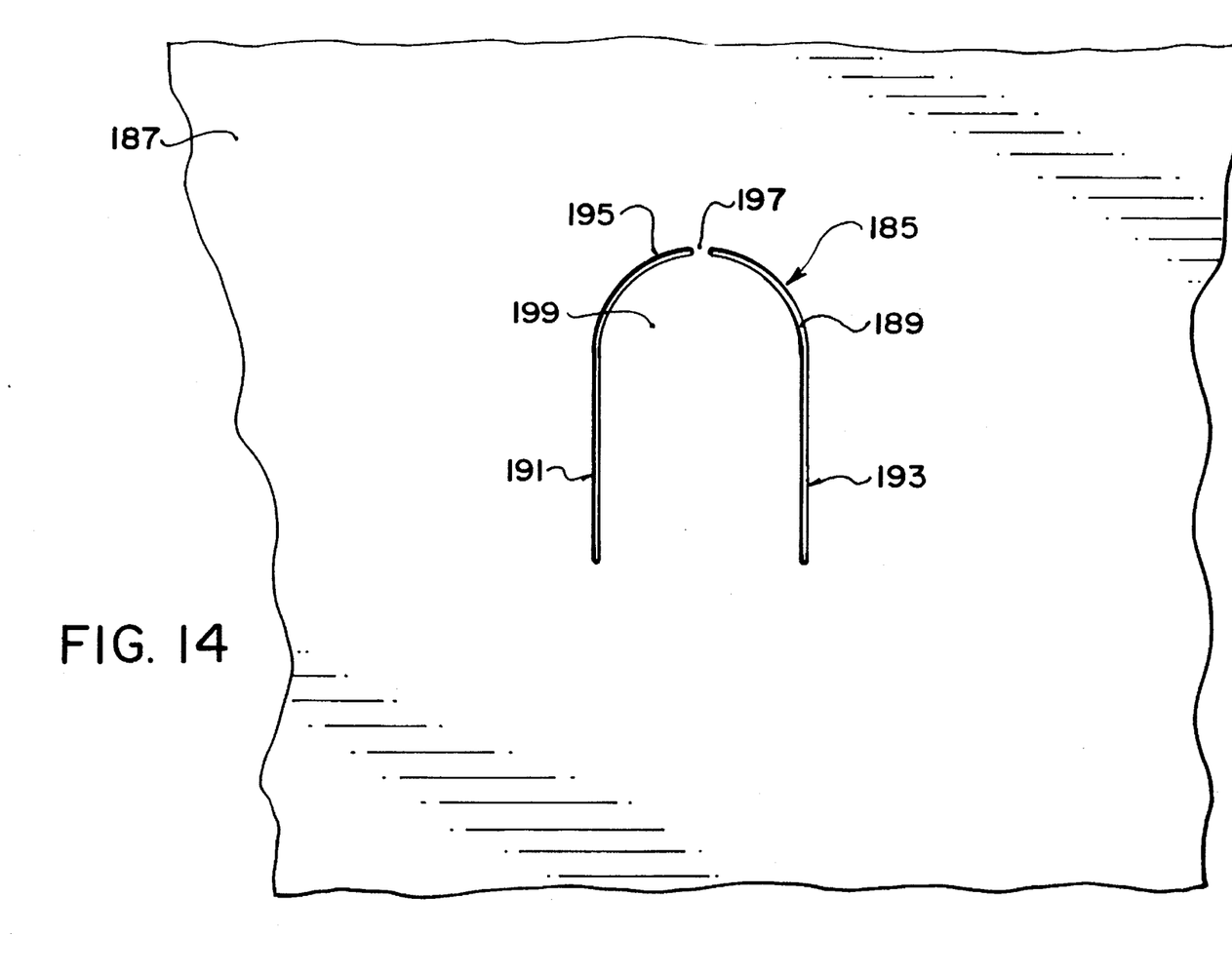
FIG. 14 is a top view showing the knock out panel.

Referring to FIG. 14 a knock out panel 185 is formed in the continuous surface of a component panel 187 such that a generally inverted U shaped slot 189 is formed in a portion of the continuous surface. The U shaped slot 189 has two arms 191 and 193 and a base 195. This forms a flexible member 199 which is free to move about an axis perpendicular to the ends of the arms of the U, that can be displaced inwards creating a temporary opening in the surface. A tab 197 initially connects the base of the U shaped member to the rest of the surface holding the member 199 in place until the tab is removed by severing thereby allowing movement of the panel.

Since various modifications can be made in my invention as hereinabove described, and many apparently widely different embodiments of same within the spirit and scope of the claims without departing from such spirit and scope, it is intended that all matter contained in the accompanying specification shall be interpreted as illustrative only and not in a limiting sense.

Embodiments in which an exclusive property or privilege is claimed are defined as follows:

1. An assembly for forming a plant covering device of the type for enclosing a space and isolating said space from external environmental conditions, said assembly comprising:

a plurality of individual component panels molded of a semi-rigid plastics material for assembly into a structure having a top and sides enclosing the space within and a bottom edge for resting on a supporting surface;

fastening means arranged along each edge of each respective individual component panel for joining the separate component panels into the completed assembly;

and fixing means for holding the plant covering device in place on the supporting surface, said fixing means comprising;

a plurality of straps;

an alignment surface arranged to lie adjacent and along each edge of each respective individual component panel for receiving a respective one of the plurality of straps thereon;

and guide means integral to the fastening means for holding a respective one of the plurality of straps laterally in place on a respective alignment surface, said guide means including;

at least one collateral guide wall for engaging a first side of a respective one of the plurality of straps, said collateral guide wall being arranged to lie adjacent and parallel to a first side of a respective alignment surface;

and a pair of end guide walls for engaging a second side of a respective one of the plurality of straps, each of said pair of end guide walls being arranged at a respective end of a respective alignment surface on a side opposite the collateral guide wall.

2. An assembly according to claim 1 wherein different configurations can be formed from the same plurality of individual component panels.

3. An assembly according to claim 1 wherein the fastening means comprise a flange arranged along each edge of each one of the respective individual component panels and at least one joiner strip for engaging said flanges.

4. An assembly according to claim 3 wherein each flange comprises a top edge, side edges, an inside face, and an outside face, said flange being aligned such that the outside face of each flange will lie collateral with respect to the outside face of the flanges on any other component panel, so as to cooperate with said other flanges, and wherein each flange is spaced in from each corner of each respective individual component panel.

5. An assembly according to claim 4 wherein a pair of flanges on any two separate components are fixed together such that the outside surfaces of the flanges are collateral, the flanges being fixed together using a joiner strip.

6. An assembly according to claim 3 wherein the joiner strip is composed of a length of elongate elastic material being of a generally inverted U shape in cross section.

7. An assembly according to claim 6 wherein the flanges and panels are molded of a single piece of material.

8. An assembly according to claim 4 wherein each collateral guide wall of the guide means is formed by the inside face of a respective flange and each end wall of the guide means is formed by the side edge of a respective flange.

9. An assembly according to claim 1 wherein each at least one collateral guide wall projects outwards from a respective individual component panel and wherein each at least one end guide wall projects outwards from the respective individual component panel.

10. An assembly according to claim 1 wherein one of the plurality of individual component panels comprises a top corner panel of at least one sheet of structural material joined or formed into a single piece, the sheet being generally part spherical with an apex at a top, a right side edge, a left side edge, and a bottom edge such that the right side edge extends downward from the apex to the bottom edge meeting at a right most bottom corner, a left side edge extends downward from the apex to the bottom edge meeting at a left most bottom corner in such a way as to result in a continuous surface therebetween describing an angle of 90 degrees in the horizontal plane from the right most bottom corner to the left most bottom corner, and an angle of 90 degrees in the vertical plane from the apex to each of the right most bottom corner and the left most bottom corner thereby enclosing a space therein, the continuous surface having an inner and outer surface, and wherein each side edge projects at an angle away from the outer surface forming an alignment surface then projects perpendicular to the alignment surface forming a flange extending along each side edge, the flange being spaced in from the apex and each corner such that the plane of the flange on the right side lies at 90 degrees to the plane of the flange on the left side, the bottom edge projecting vertically downwards a distance forming an alignment surface then projecting horizontally outwards forming a flange perpendicular to the alignment surface, the flange being spaced in from each corner lying in the horizontal plane and extending along the bottom edge.

11. An assembly according to claim 1 wherein one of the plurality of individual component panels comprises a flat panel of at least one sheet of structural material joined or formed into a single piece, the sheet being generally rectangular in shape having a top edge, bottom edge, and side edges meeting at each of four corners in such a way as to form a continuous surface therebetween, the continuous surface having an inner and outer surface, and wherein each edge has a flange projecting perpendicular to and outward from the outer surface of the panel, the flange being spaced in from each corner and extending along the edge.

12. An assembly according to claim 1 wherein one of the plurality of individual component panels comprises an angled panel of at least one sheet of structural material joined or formed into a single piece, the sheet being generally rectangular in shape having a top edge, bottom edge, and side edges meeting at each of four corners in such a way as to form a continuous surface therebetween, the continuous surface having an inner and outer surface, such that the continuous surface is angled inwards along a line running parallel to the top and bottom edges of the panel, and wherein each side edge has a flange projecting perpendicular to the outer surface of the panel, the flange being spaced in from each corner and extending along the side edge, the top edge projecting horizontally outwards a distance forming the alignment surface then projecting vertically upwards forming a flange perpendicular to the alignment surface, the flange being spaced in from each corner lying in the vertical plane and extending along the top edge, and the bottom edge which projects vertically downwards a distance forming the alignment surface then projects horizontally outwards forming a flange perpendicular to the alignment surface, the flange being spaced in from each corner lying in the horizontal plane and extending along the bottom edge.

13. An assembly according to claim 1 wherein the alignment surfaces of each individual component panel are arranged to align with the alignment surfaces of adjacent individual component panel when the plurality of individual component panels are assembled into the structure.

14. An assembly according to claim 13 wherein each one of the plurality of straps is arranged to lie on aligned alignment surfaces of assembled individual component panels, said straps being held laterally on said alignment surfaces by the guide means such that each one of the plurality of straps is guided over the assembled structure from a first side of the assembled structure to a second side of the assembled structure, and wherein each one of the plurality of straps is fixed at each end by a strap fastener and peg arrangement thereby fixing the plant covering device to a supporting surface.

15. An assembly according to claim 14 wherein the strap fastener and peg arrangement comprise a strap fastener having a body of generally rectangular shape with a similarly rectangular opening in the centre sized so as to allow a strap to pass through, and a tab attached to one side of the body wherein said tab folds over so as to lie across the main body in such a way so as to cover both a portion of the body of the fastener and a portion of the opening such that one free end of a strap is positioned so that it is folded back upon a portion of the length of said strap forming a loop, said loop being placed through the opening in the strap fastener body from one side and over a folded tab, the free end being draw back out of the opening from the same side of the strap fastener body such that the strap is held between the tab and the body of the fastener, a peg is placed through the opening in the strap fastener and fixed to a supporting surface.

16. An assembly according to claim 1 wherein a knock out panel is formed in the continuous surface of a component panel such that a portion of the continuous surface is free to move about an axis forming a flexible member which can be displaced inwards creating a temporary opening in the surface and where the member is initially held in place on the surface by a flange which is removed by severing thereby allowing movement of the panel.

17. A kit of parts for forming a plant covering device of the type for enclosing a space and isolating said space from external environmental conditions, said kit comprising a plurality of individual component panels molded of a semi-rigid plastics material for assembly into a structure wherein the individual component panels are provided with fastening means for joining the separate component panels into a completed assembly, said assembly having a top, sides, and a bottom edge, the bottom edge for resting on a supporting surface, and wherein the kit of parts has fixing means for holding the plant covering device in place on a supporting surface;

and wherein the fixing means comprise a strapping arrangement;

and wherein each one of the plurality of straps is arranged to lie on aligned alignment surfaces of assembled individual component panels, said straps being held laterally on said alignment surfaces by guide means such that each one of the plurality of straps is guided over the assembled structure from a first side of the assembled structure to a second side of the assembled structure, and wherein each one of the plurality of straps is fixed at each end by a strap fastener and peg arrangement thereby fixing the plant covering device to a supporting surface;

and wherein the strap fastener and peg arrangement comprises a strap fastener having a body of generally rectangular shape with a similarly rectangular opening in the centre sized so as to allow a strap to pass through, and a tab attached to one side of the body wherein said tab folds over so as to lie across the main body in such a way so as to cover both a portion of the body of the fastener and a portion of the opening such that one free end of a strap is positioned so that it is folded back upon a portion of the length of said strap forming a loop, said loop being placed through the opening in the strap fastener body from one side and over a folded tab, the free end being draw back out of the opening from the same side of the strap fastener body such that the strap is held between the tab and the body of the fastener, a peg is placed through the opening in the strap fastener and fixed to a supporting surface.

* * * * *